No. 886,481. PATENTED MAY 5, 1908.
J. J. DANIEL.
CEMENT WATER TANK.
APPLICATION FILED JAN. 14, 1907.

Witnesses:
Fred Palm
Geo. Felber

Inventor:
John J. Daniel
By Oliphant & Young
Attorneys.

UNITED STATES PATENT OFFICE.

JOHN J. DANIEL, OF CAMBRIA, WISCONSIN.

CEMENT WATER-TANK.

No. 886,481.

Specification of Letters Patent.

Patented May 5, 1908.

Application filed January 14, 1907. Serial No. 352,141.

*To all whom it may concern:*

Be it known that I, JOHN J. DANIEL, a citizen of the United States, and resident of Cambria, in the county of Columbia and State of Wisconsin, have invented certain new and useful Improvements in Cement Water-Tanks; and I do hereby declare that the following is a full, clear, and exact description thereof.

My invention consists in certain peculiarities of construction and combination of parts as hereinafter set forth and claimed with reference to the accompanying drawings, its object being to provide simple, strong, and durable cement water-tanks for animals.

Tanks heretofore constructed of cement for the purpose above; owing to the rough usage to which they are subjected, soon become cracked or broken and in consequence useless. My invention is designed to overcome these defects by interweaving wire-strands with the cement so as to materially strengthen the same.

Figure 1:
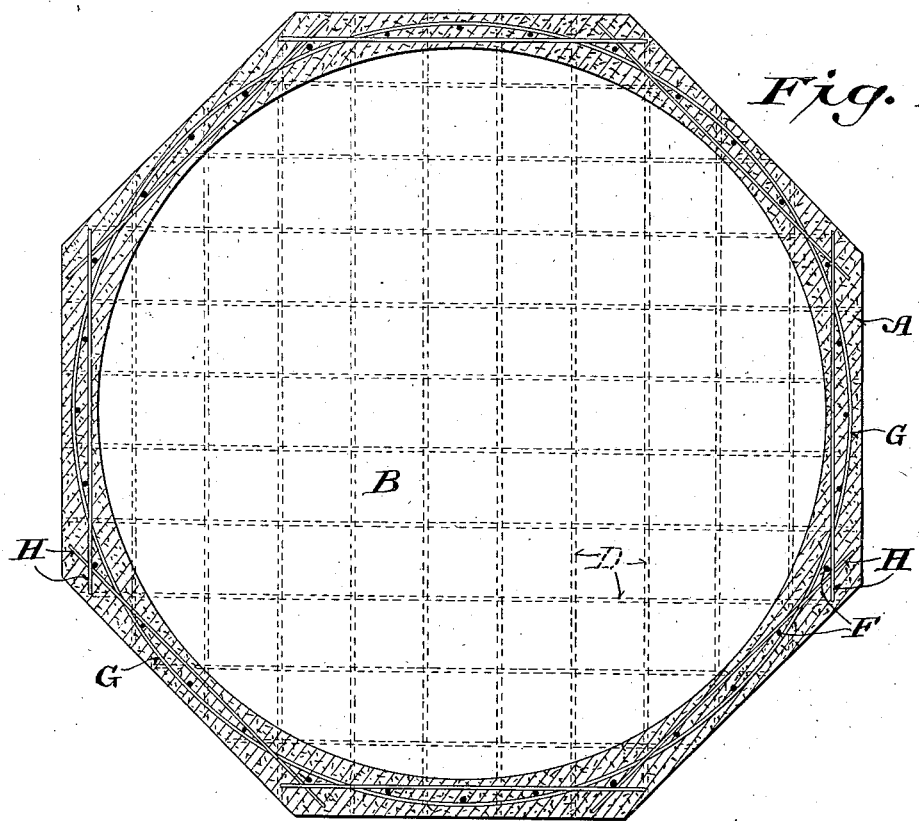
Figure 2:
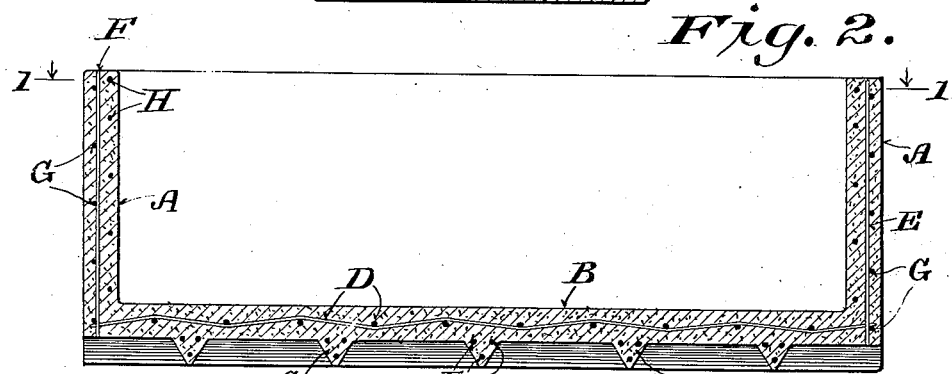
Figure 3:
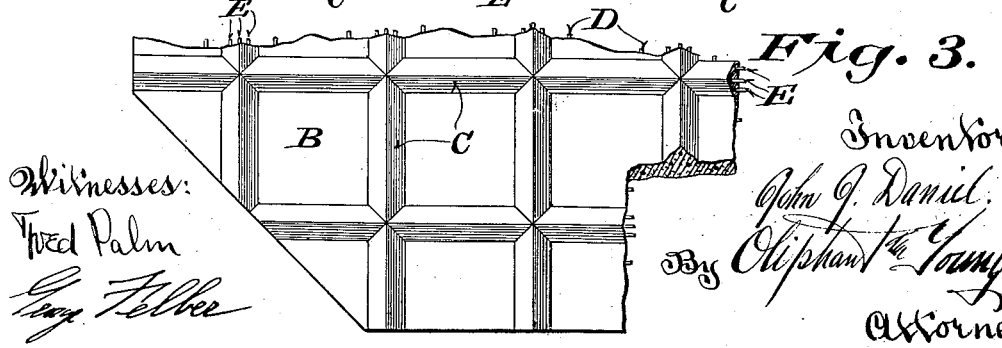

In the drawings: Figure 1 is a plan sectional view of a tank embodying the features of my invention; Fig. 2, a transverse section of the same, and Fig. 3, an inverted plan view of a portion of the bottom illustrating the manner of ribbing the same to insure strength.

Referring by letter to the drawings, A indicates the walls of an octangular cement-tank, the inner surface of which is circular. The bottom B of the tank is preferably formed with exterior intersecting cross-ribs C, which ribs are formed by channeling the ground upon which the tank is molded. Interwoven cross-wires D are molded into the bottom, and the cross-ribs C are also provided with wire-stringers E, it being understood that all the wires are laid into the cement in the process of molding.

In order to strengthen the walls of the tank, which are subjected to the greatest strain by reason of animals pressing against the same, a series of upright wires F are set into the cement throughout the circumferential walls of said tank from bottom to top. The wires are then reinforced by circumferentially wound wires G at intervals throughout the height of the aforesaid tank-walls, and also short straight sections of wire H, which are laid parallel with the octangular sides, as best illustrated in Fig. 1, of the drawings.

By the above construction of wires, it will be seen that both the walls and bottom of the tank are greatly increased in strength to resist pressure from within or exterior of the tank, the said structure at the same time adding a toughness to the cement material, which will render the said tank less liable to crack.

I claim:

1. A cement water tank, having its walls reinforced with circumferential wires molded therein, upright wires interwoven with the circumferential wires, other wires molded in the tank-bottom, cross-ribs depending from the bottom, and wires molded in the ribs.

2. A cement water-tank, having its walls reinforced with horizontal circumferential wires and alternate straight wire-sections having overlapped ends, vertical wires interwoven with the circumferential and straight wire-sections, other wires molded in the tank-bottom, cross-ribs depending from the bottom, and wires molded in the ribs.

In testimony that I claim the foregoing I have hereunto set my hand at Cambria in the county of Columbia and State of Wisconsin in the presence of two witnesses.

JOHN J. DANIEL.

Witnesses:
M. J. ROWLAND,
MARY B. GLASO.